United States Patent
Kondo et al.

(10) Patent No.: US 6,714,252 B2
(45) Date of Patent: Mar. 30, 2004

(54) IMAGE SIGNAL PROCESSING APPARATUS AND DIGITAL SIGNAL PROCESSING METHOD

(75) Inventors: Tetsujiro Kondo, Tokyo (JP); Yasushi Tatehira, Kanagawa (JP); Takao Inoue, Tokyo (JP); Takashi Aoki, Saitama (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 09/863,497

(22) Filed: May 23, 2001

(65) Prior Publication Data

US 2002/0027611 A1 Mar. 7, 2002

(30) Foreign Application Priority Data

May 24, 2000 (JP) ........................................ 2000-153856

(51) Int. Cl.[7] ................................................. H04N 7/01
(52) U.S. Cl. ...................................... 348/458; 348/448
(58) Field of Search ................................ 348/448, 458, 348/441, 571, 452, 451, 446, 443; 382/173, 238; H04N 7/01, 11/20

(56) References Cited

U.S. PATENT DOCUMENTS

| | | | | |
|---|---|---|---|---|
| 5,666,164 A | * | 9/1997 | Kondo et al. | ................ 348/441 |
| 5,748,235 A | * | 5/1998 | Kondo et al. | ................ 348/441 |
| 5,946,044 A | * | 8/1999 | Kondo et al. | ................ 348/458 |
| 6,323,905 B1 | * | 11/2001 | Kondo et al. | ................ 348/441 |
| 6,483,545 B1 | * | 11/2002 | Kondo et al. | ................ 348/448 |

FOREIGN PATENT DOCUMENTS

JP          8-56335     *   2/1996

* cited by examiner

*Primary Examiner*—Sherrie Hsia
(74) *Attorney, Agent, or Firm*—Frommer Lawrence & Haug LLP; William S. Frommer

(57) ABSTRACT

In each conversion blocks 10, 20 and 30, pixels adjacent to a subject pixel data are selected in the class tap construction section from SD signals, the detection of level distribution pattern of the pixel data is performed in the class categorization section and a class is determined based on the detected pattern. The pixel data of the subject pixel is generated by reading the prediction coefficient corresponding to classes from the prediction coefficient memory and performing prediction operation in the sum of products operation section using pixel data of the selected pixel selected by the prediction tap construction section and the prediction tap selection section and the read prediction coefficient. According to the selection of the switching sections 41 and 42, a HD signal having a high resolution is obtained and a signal whose tone level of a SD signal is corrected is obtained.

10 Claims, 13 Drawing Sheets

(CATHODE-RAY TUBE)

(LIQUID CRYSTAL
DISPLAY ELEMENT)

F I G. 4
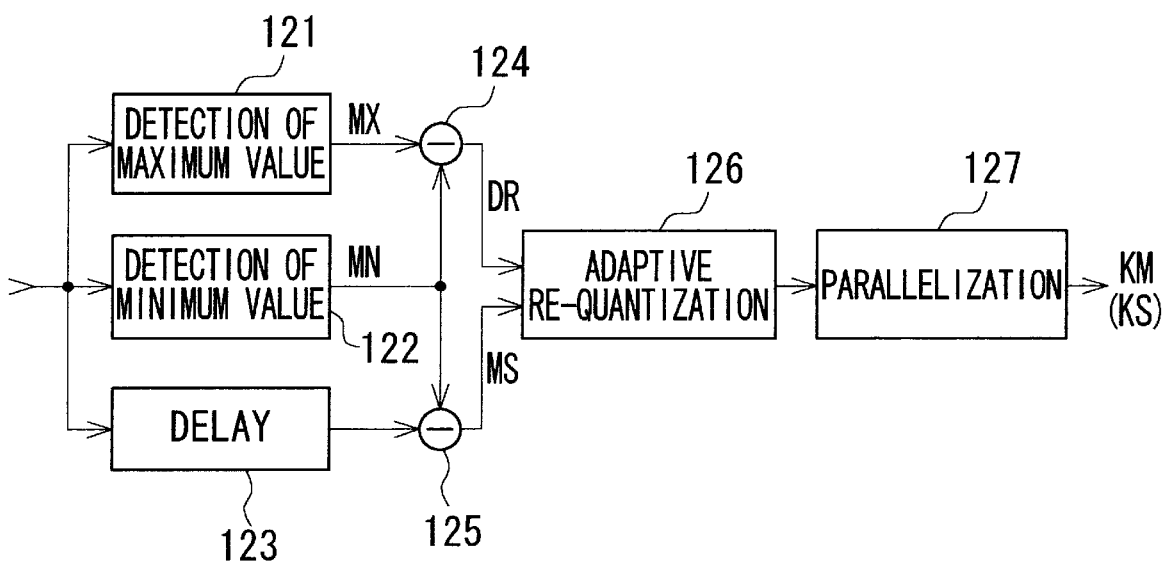

(RESOLUTION CONVERSION MAIN BLOCK)

(RESOLUTION CONVERSION SUB BLOCK)

(BEFORE TONE CONVERSION)

(AFTER TONE CONVERSION)

(BEFORE TONE CONVERSION)

(AFTER TABLE CONVERSION)

(AFTER TONE CONVERSION OF PRESENT INVENTION)

(OPERATION IS SMALL)

(OPERATION IS LARGE)

IMAGE SIGNAL PROCESSING APPARATUS AND DIGITAL SIGNAL PROCESSING METHOD

BACKGROUND OF THE INVENTION

1. Field of the Invention

The present invention relates to a digital signal processing apparatus and a digital signal processing method. Particularly, it relates to the digital signal processing apparatus and method for processing an input digital image signal and generating an output digital image signal.

2. Description of the related art

Recently, an image display device using a cathode-ray tube as a display device has been connected with a variety of digital devices to display an image on the display device. On the image display device, the resolution has been also enhanced so that the image display device can display an image very finely. Therefore, when a signal output from the digital device is a SD (Standard Definition) signal corresponding to a video signal according to NTSC system the SD signal may be converted into a HED (High Definition) signal corresponding to a video signal with a high resolution to display an image of high quality and thus converted signal may be supplied to the image display device.

Moreover, as the display device, not only a cathode-ray tube has been used, but also a liquid crystal display panel, plasma display panel or the like has been used for reducing the power consumption, upsizing the display screen, reducing the space and so forth.

When types of display devices are different, for example, if a SD signal is converted into a HD signal and thus converted signal is supplied to the image display device having display device such as liquid crystal display panel, as do the image display device using the cathode-ray tube, this may prevent such image display device having liquid crystal display panel from displaying an image of high quality because of the difference of the characteristics of display devices.

FIGS. 1 and 2 respectively show the characteristics of a cathode-ray tube and a liquid crystal display element used as a display device. Now, in the case of a cathode-ray tube, as shown in FIG. 1, it is known that the relationship between an input signal and a luminance changes in proportion to an input signal to the power of $\gamma(=\text{about } 2.2)$. On the other hand, in the case of a liquid crystal display element, as to the relationship between the input signal and the light transparency (luminance), when a signal level of input signal is low or high, the changing amount of the luminance is little, as shown in FIG. 4. Further, when the signal level is at intermediate level, the luminance largely changes corresponding to a signal level of the input signal. Therefore, for example, when the input signal is in a range of A or A', no changes of the input signal appear as the difference of luminance, and thus its luminance information is missed in the liquid crystal display element. Moreover, in the liquid crystal display element, since strengths of electric field applying to a liquid crystal layer are different depending upon dispersion of a liquid crystal cell in the direction of thickness thereof, a dispersion of the luminance may occur. Furthermore, the contrast ratio in a liquid crystal display element is in the order of a fraction of that of the cathode-ray tube. Therefore, where a liquid crystal display element is used as a display device, a high quality display image may be obtained by making up the deficit tone rather than by enhancing the resolution.

OBJECT AND SUMMARY OF THE INVENTION

It is accordingly an object of the invention to provide digital signal processing apparatus and method capable of displaying an image of a high quality by enhancing the resolution or by making up the tone corresponding to a display device for use.

The present invention relates to a digital signal processing apparatus comprising generating means for generating an output digital image signal and control means for controlling the generating means. According to his invention, the generating means is supplied with an input digital image signal. In accordance with one aspect of the invention, a plurality of pixel data adjacent to a subject pixel data is selected out of the input digital image signal and clustered to produce each class. A memory stores predictive operation parameter data for respective classes at addresses corresponding to the respective classes determined by the clustering means. Selecting means selects a plurality of pixel data corresponding to a pixel data of the output digital image signal from the input digital image signal. Predictive operating means operates said predictive operation parameter data from said memory and the plurality of pixel data from said selecting means. The control means controls the generating means such that the generating means selects one of a plurality of kinds of predictive operation and generates the output digital image signal corresponding to the selected kind of predictive operation.

In accordance with another aspect of the invention, a digital signal processing method for processing an input digital image signal and generating an output digital image signal is provided. In the method, a plurality of pixel data of the input digital image signal adjacent to a subject pixel data are clustered to produce each class, and predictive operation parameter data for respective classes is stored at addresses of memory corresponding to the respective classes determined by the clustering means. A plurality of pixel data are then selected from the input digital image signal corresponding to a pixel data of the output digital image signal. The predictive operation parameter data from the memory and the plurality of pixel data from said selecting means are operated to produce a plurality of kinds of predictive operation of generating means. Further, one of the kinds of predictive operation is selected to generate the output digital image signal corresponding to the selected kind of predictive operation.

The conclusion portion of this specification particularly points out and distinctly claims the subject matte of the present invention. However those skill in the art will best understand both the organization and method of operation of the invention, together with further advantages and objects thereof, by reading the remaining portions of the specification in view of the accompanying drawing(s) wherein like reference characters refers to like elements.

BRIEF DESCRIPTION OF THE DRAWINGS

FIG. 4 is a block diagram showing a constitution of a class categorization section shown in FIG. 3;

DETAILED DESCRIPTION OF THE PREFERRED EMBODIMENTS

Hereinafter, one embodiment of the present invention will be described with reference to the drawings. In one embodiment, a resolution conversion processing for making up resolution or a tone conversion processing for enhancing a tone is carried out to an input image signal, for example, a signal such that a video signal according to NTSC system or the like is digitalized (hereinafter, referred to as SD (Standard Definition) signal), by switching them corresponding to the display device employing in an image display device.

In this resolution conversion processing, the signal having the resolution of image enhanced on the basis of SD signal by performing a class categorization adaptation (hereinafter, referred to as HD processing (High Definition) signal) is generated. Specifically, an information memory means for storing a prediction operation setting information which has been previously derived from learning per each class is provided as well as class division is carried out corresponding to three dimensional (time and space) distribution of a signal level of a SD signal, the most suitable estimate value is output by performing operation on the basis of a prediction operation setting information corresponding to a class, the number of pixels are made increased in the horizontal direction and the vertical direction and a HD signal having a resolution higher than that of SD signal is generated.

Moreover, in the tone conversion processing, a tone of an image on the basis of a SD signal is enhanced than before the tone conversion by performing a class categorization adaptation processing. Specifically, an information memory means for storing a prediction operation setting information which has been previously derived from learning per each class is provided as well as the most suitable estimate value is output by performing operation on the basis of a prediction operation setting information corresponding to a class, and a SD signal whose tone has been enhanced is generated.

Figure 3:
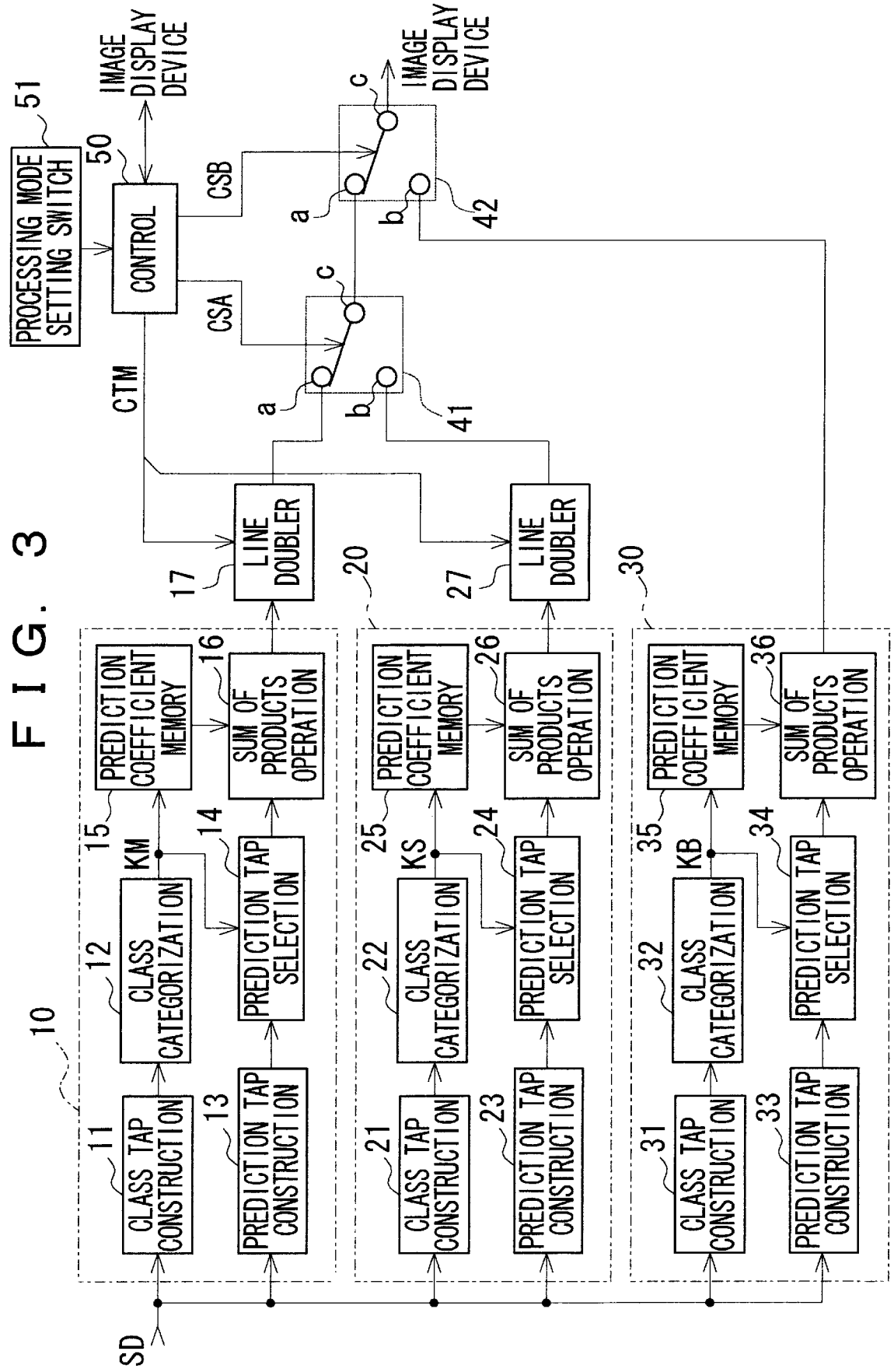
FIG. 3 is a block diagram showing a constitution of an embodiment of a digital signal processing apparatus of the present invention.

FIG. 3 shows a constitution of a digital signal processing apparatus with reference to this invention. A luminance data of a SD signal is supplied to a class tap construction section 11 of a resolution conversion main block 10, a prediction tap construction section 13, a class tap construction section 21 of a resolution conversion sub-block 20, a prediction tap construction section 23, a class tap 31 of a tone level conversion block 30, and a prediction tap construction section 33. It should be noted that the resolution conversion main block 10 and the resolution conversion sub-block 20 are in a similar constitution, the description of the resolution conversion sub-block 10 is substituted by that of the resolution conversion main block 10.

In the class tap construction section 11 (21), the slicing of the region of a plurality of pixels on the periphery (hereinafter, referred to as "peripheral pixel for resolution conversion") of the pixel of interest to be prepared is carried out in order to enhance the resolution (hereinafter, referred to as "preparation pixel"), and a pixel data within the region is supplied to a class categorization section 12 (22) as a space class tap.

In the class categorization section 12 (22), a pattern of level distribution of a space class tap is distinguished and class categorization is carried out. In this case, in order to prevent the number of classes from being enlarged, for example, such a processing is performed so that an input data of each pixel 8 bits (256 kinds) is compressed into a space class categorization code of less number of bits. For example, by employing ADRC (Adaptive Dynamic Range Coding), a space class categorization code whose number of bits is small can be generated from space class tap. It should be noted that as information compression means, compression means such as DPCM (prediction coding), VQ (vector quantization) or the like except for ADRC may be employed.

ADRC is an adaptive re-quantization method which has been developed for a high efficient coding for a VTR (Video Tape Recorder), however, a local pattern of a signal level can be efficiently expressed in a short word length, in this embodiment, ADRC is used in the generation of a space class categorization code.

FIG. 4 shows a constitution of a class categorization section 12 employing ADRC, shown in FIG. 3. Data of peripheral pixel for resolution conversion is supplied to a maximum value detection circuit 121, a minimum value detection circuit 122, and a delay circuit 123. In the maximum value detection circuit 121, the maximum value Mx is detected from the sliced luminance data of the peripheral pixel for resolution conversion and supplied to a subtracter 124. Moreover, in the minimum value detection circuit 122, the minimum value MN is detected from the sliced luminance data of peripheral pixel for resolution conversion and supplied to the subtracters 124 and 125. In the subtracter 124, the minimum value MN is subtracted from the maximum value Mx, a dynamic range DR is calculated. The calculated dynamic range DR is supplied to an adaptive re-quantization circuit 126.

In delay circuit 123, a luminance data of pixel is delayed by the portion of the time period that the maximum value detection circuit 121 and the minimum value detection circuit 122 are taken in detection, respectively, and supplied to the subtracter 125. In the subtracter 125, the minimum value MN is subtracted from the supplied data, and the obtained subtracted value MS is supplied to the adaptive re-quantization circuit 126.

In the adaptive re-quantization circuit 126, quantization of the subtracted value MS is performed per each pixel using the predetermined quantization step width corresponding to a dynamic range DR. Furthermore, data obtained by quantization is parallelized per each unit of pixel slicing by a parallelized circuit 127, and supplied to the prediction tap selection 14 (24) and a prediction coefficient memory 15 (35) shown in FIG. 3 as a space class categorization code KM (KS).

In the prediction tap construction section 13 (23), the region in which a plurality of pixels necessary to the prediction operation from SD signal (hereinafter, referred to this as prediction tap) are contained is sliced, data of a prediction tap is supplied to the prediction tap selection section 14 (24). In the prediction tap selection section 14 (24), the selection of the pixel supplied from the prediction tap construction section 13 (23) is carried out on the basis of the space class categorization code from the class categorization section 12 (22), and the selected pixel data is supplied to a sum of products operation section 16 (26).

In the prediction coefficient memory 15 (25), the prediction coefficient obtained by learning the relationship between a SD signal and a HD signal is memorized per each class as prediction operation setting information. This prediction coefficient is information for converting a SD signal into a HD signal by linear estimation expression. It should be noted that a method of acquiring a prediction coefficient is described later. Here, when space class categorization code KM (KS) is supplied to the prediction coefficient memory 15 (25), a prediction coefficient corresponding to this space class categorization code is read and supplied to the sum of products operation section 16 (26).

In the sum of products operation section 16 (26), operation of linear combination expression (Expression 1) of prediction tap (pixel value) T1, T2 . . . Ti from the prediction tap selection section 14 (24) and prediction coefficient read from the prediction coefficient memory 15 (25) w1, w2 . . . wi is performed, thereby calculating pixel data newly formed.

$$L1 = w1 \times T1 + w2 \times T2 + \ldots + wi \times Ti \tag{1}$$

In this way, operation is performed on the basis of a prediction coefficient and a prediction tap of a class corresponding to a pattern of level distribution of a space class tap as well as a prediction coefficient is previously found per class by learning and stored in the prediction coefficient memory 15 (25) and pixel data of HD signal is generated.

Here, the sum of products operation section 16 outputs data on the existing line of SD signal, and the sum of products operation section 26 outputs data on the preparation line located between the existing lines. At the same time, the sum of products operation sections 16 and 26 output pixel data of the number of two fold in the horizontal direction.

The pixel data generated in the sum of products operation section 26 is supplied to a line doubler 27 as well as the generated pixel data in the sum of products operation section 16 is supplied to a line doubler 17.

The line doublers 17 and 27 perform processing of line double speed. The sum of products operation sections 16 and 26 generate pixel data of HD signal from SD signal, however, horizontal cycle of the generated pixel data is the same as that of SD signal. Therefore, the line doublers 17 and 27 perform a line double speed processing for making the horizontal frequency two fold by write and read control signal CTM. Data output from the line doubler 27 after the line double speed processing is performed is supplied to the terminal b of a signal switching section 41 as well as data output from the line doubler 17 after this line double speed processing is performed is supplied to the terminal (a) of a signal switching section 41.

The signal switching section 41 switches a movable terminal (c) to a terminal (a) and a terminal (b) in the horizontal cycle of HD signal on the basis of switching control signal CSA from the control section 50 described later. Moreover, in the movable terminal c, the terminal a of the signal switching section 42 is connected, data derived from selecting alternatively data from the line doubler 17 and 27 in a horizontal cycle, specifically, HD signal whose resolution of SD signal is enhanced is supplied to the terminal (a) of the signal switching section 42.

Next, in the class tap construction section 31 of the tone conversion block 30, the region of the pixel of interest which is a pixel correcting a luminance level and a plurality of pixels on the periphery of the pixel of interest (hereinafter, referred to as "peripheral pixel for tone conversion") is sliced, the luminance data of the pixels within the region is supplied to the class categorization section 32.

In the class categorization section 32, a class categorization is performed by determining not only the luminance level of pixel of interest but also pattern of luminance level of peripheral pixels. Also in this class categorization section 32, similar to the class categorization section 12, the luminance class categorization code is generated using ADRC and supplied to the prediction tap selection section 34 and the prediction coefficient memory 35 as shown in FIG. 3.

Here, in the class categorization section 32, for example, the luminance class categorization code corresponding to the luminance level of the pixel of interest and the luminance class categorization code corresponding to the distribution pattern of the luminance level on the basis of the pixel of interest and peripheral pixels for tone conversion are generated, the luminance class categorization code KB is generated on the basis of these two class categorization codes and supplied to the prediction tap selection section 34 and the prediction coefficient memory 35.

In the prediction tap construction section 33, a prediction tap which is a pixel for prediction operation is sliced from SD signal, and the luminance data of this prediction tap is supplied to the prediction tap selection section 34.

In the prediction tap selection section 34, the selection of pixel supplied from the prediction tap construction section 33 is performed on the basis of the luminance class categorization code KB from the class categorization section 32, and the luminance data of the selected pixel is supplied to the sum of products operation section 36.

In the prediction coefficient memory 35, the acquired prediction coefficient is memorized as prediction operation setting information per each class by learning the relationship between SD signal of proper tone before the correction is carried out and the luminance of an image displayed on the display device. This prediction coefficient is information for performing a conversion processing in which signal is made so that the luminance level of the signal is corrected by the linear estimation expression and tone level creation of the signal is performed. It should be noted that a method of acquiring a prediction coefficient is described later.

Now, when the luminance class categorization code KB is supplied to the prediction coefficient memory 35, a prediction coefficient corresponding to the luminance class categorization code is read and supplied to the sum of products operation section 36.

In the sum of products operation section 36, operation of linear combination expression (Expression 2) of prediction tap (pixel value) T1c, T2c . . . Tic from the prediction tap selection section 34 and prediction coefficient read from the prediction coefficient memory 35 w1c, w2c . . . wic is performed, thereby calculating new pixel data of the pixel of interest.

$$G = w1c \times T1c + w2c \times T2c + \ldots + wic \times Tic \quad (2)$$

In this way, operation is performed on the basis of a prediction coefficient and a prediction tap of class corresponding to the pattern of luminance level distribution as well as the prediction coefficient is found by previously learning per each class and memorized in the prediction coefficient memory 35, and the luminance data of pixel of interest is corrected and supplied to the terminal b of the signal switching section 42.

In the signal switching section 42, the switching control signal CSB is supplied from the control section 50, and the movable terminal (c) is switched to the side of the terminal (a) or to the side of the terminal (b) by this switching control signal CSB.

To the control section 50, a processing mode setting switch 51 is connected, switching control signal CSA and CSB are generated corresponding to the switch setting condition of the processing mode setting switch 51, supplied to the signal switching sections 41 and 42, and the resolution conversion or tone level conversion is alternatively selected. Moreover, in the control section 50, for example, as DVI (Digital Visual Interface) worked out by DDWG (Digital Visual Working Group), the connection of an image display device is detected by a hot plug function, the name of the model of an image display device and display device information such as resolution and the like are obtained by plug and play realized using the function of DDC (Display Data Channel), and a display device employed in the image display device is discriminated. Here, in the control section 50, the determination of whether or not the display device is made of cathode-ray tube or a liquid crystal display element or like, and the determination of to what degree the resolution is enhanced are performed, either the resolution conversion or tone level conversion is alternatively selected by generating switching control signal CSA and CSB on the basis of the determination results and supplied to the signal switching sections 41 and 42.

Next, the preparation (learning) of a prediction coefficient will be described below. In order to obtain a prediction coefficient by learning, a student signal is generated from teacher signal DY by filter corresponding to a display device, teacher signal DY input in the filter and student signal DS output from the function filter are made as a pair for learning, the preparation of a prediction coefficient is carried out.

Figure 5:
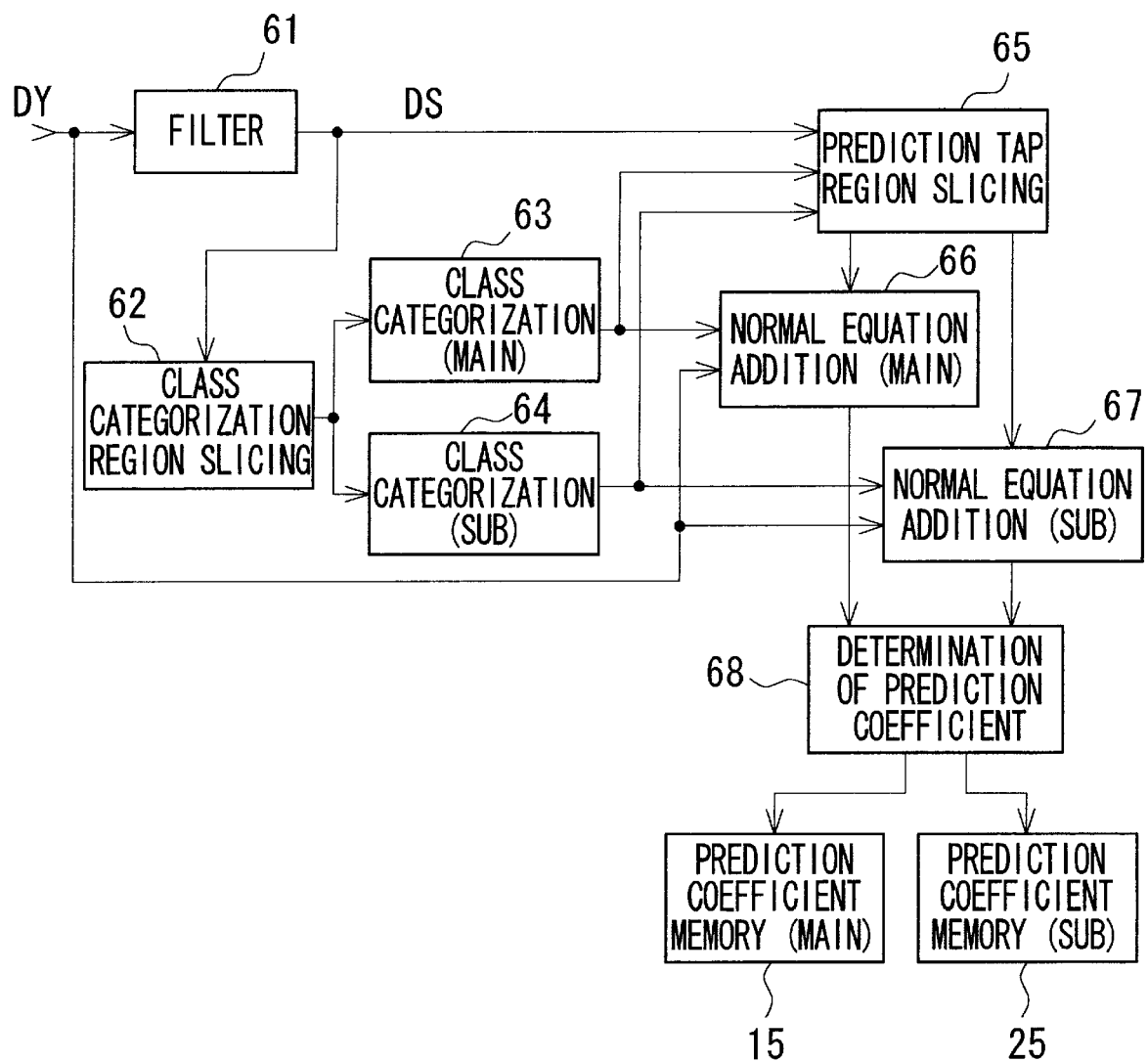
FIG. 5 is a block diagram showing a constitution of a prediction coefficient learning block (resolution conversion)

FIG. 5 shows a constitution of prediction coefficient learning block for preparing a prediction coefficient necessary for performing resolution conversion. In the filter 61, SD signal is formed by performing thinning out processing to the HD signal which is teacher signal. For example, the number of pixels in the horizontal direction and vertical direction are made as ½, respectively, SD signal is formed as a student signal.

A SD signal from the filter 61 is supplied to the class categorization region slicing section 62 and the prediction tap region slicing section 65. In the class categorization region slicing section 62, the region slicing from the SD signal is performed, pixel data within the region is supplied to the class categorization sections 63 and 64.

The class categorization sections 63 and 64 generate the class categorization code using ADRC similar to the class categorization sections 12 and 22 in the signal conversion device shown in FIG. 3. Here, in the class categorization section 63, the class categorization code related to the data on the line of the SD signal is generated and supplied to the prediction tap region slicing section 65 and the normal equation adding section 66. Moreover, in the class categorization section 64, the class categorization code related to the data between lines of SD signals is generated, and supplied to the prediction tap region slicing section 65 and the normal equation adding section 67.

In the prediction tap region slicing section 65, the slicing of the prediction tap region for preparing the data on the line of a SD signal is performed on the basis of the class categorization code from the class categorization section 63, the data within the region is supplied to the normal equation adding section 66 as a prediction tap. Moreover, the slicing of the prediction tap region for preparing data between lines of the SD singles is performed on the basis of the class categorization code from the class categorization section 64, and the data within the region is supplied to the normal equation adding section 67 as a prediction tap.

In the normal equation adding sections 66 and 67, the normal equation data is generated and supplied to the prediction coefficient determination section 68, in the prediction coefficient determination section 68, a operation processing is performed using the normal equation data and the prediction coefficient is operated.

Now, to generalize the description of the operation of the prediction coefficient, the operation of prediction coefficient by utilizing n pixels will be described below. When supposing that respective luminance levels of input pixels selected as a prediction tap is $x1, \ldots xn$ and a luminance level of output pixel is y, set the linear estimation equation of n tap by utilizing prediction coefficients $w1, \ldots, wn$. This is shown in the following expression (3):

$$y = w1 \times x1 + w2 \times x2 + \ldots + wn \times xn \quad (3)$$

As a method of finding prediction coefficients $w1, \ldots wn$ in this expression (3), the solution by method of least squares is considered. In this solution, data is collected so that an observation equation of the expression (4) is made by supposing that X is a luminance level of input pixel, W is a prediction coefficient, and Y is a luminance level of output pixel. In this expression (4), m represents the number of learning data, and n represents the number of prediction taps as described above.

$$XW = Y \quad (4)$$

$$\text{Provided,} \quad X = \begin{bmatrix} x11 & x12 & \ldots & x1n \\ x21 & x22 & \ldots & x2n \\ \ldots & \ldots & \ldots & \ldots \\ xm1 & xm2 & \ldots & xmn \end{bmatrix},$$

$$W = \begin{bmatrix} w1 \\ w2 \\ \ldots \\ wn \end{bmatrix}, \quad Y = \begin{bmatrix} y1 \\ y2 \\ \ldots \\ ym \end{bmatrix}$$

Next, write a residual equation of the expression (5) based on the observation equation of the expression (4).

$$XW = Y + E, \quad \text{Provided,} \quad E = \begin{bmatrix} e1 \\ e2 \\ \ldots \\ em \end{bmatrix} \quad (5)$$

From this expression (5), it is considered that most probable value of each prediction coefficient wi is obtained in a case where the conditions making the expression (6) minimum are held.

$$\sum_{i=1}^{m} ei^2 \qquad (6)$$

Specifically, the conditions of Expression (7) may be considered.

$$e1\frac{\partial e1}{\partial wi} + e2\frac{\partial e2}{\partial wi} + \ldots + em\frac{\partial em}{\partial wi} = 0 \quad (i = 1, 2, \ldots, n) \qquad (7)$$

Consider the conditions of n pieces based on i of Expression (7), may calculate w1, ..., wn satisfying this. Hence, the next expression (8) is obtained from Expression (5), further Expression (9) is obtained from Expression (7) and the next Expression (8).

$$\frac{\partial ei}{\partial w1} = xi1, \frac{\partial ei}{\partial w2} = xi2, \ldots, \frac{\partial ei}{\partial wn} = xin \quad (i = 1, 2, \ldots, m) \qquad (8)$$

$$\sum_{i=1}^{m} eixi1 = 0, \sum_{i=1}^{m} eixi2 = 0, \ldots, \sum_{i=1}^{m} eixin = 0 \qquad (9)$$

Then, a normal equation of the next Expression (10) can be obtained from Expression (5) and Expression (9).

$$\begin{cases} \left(\sum_{j=1}^{m} xj1xj1\right)w1 + \left(\sum_{j=1}^{m} xj1xj2\right)w2 + \ldots + \left(\sum_{j=1}^{m} xj1xjn\right)wn = \left(\sum_{j=1}^{m} xj1yi\right) \\ \left(\sum_{j=1}^{m} xj2xj1\right)w1 + \left(\sum_{j=1}^{m} xj2xj2\right)w2 + \ldots + \left(\sum_{j=1}^{m} xj2xjn\right)wn = \left(\sum_{j=1}^{m} xj2yi\right) \\ \ldots \\ \left(\sum_{j=1}^{m} xjnxj1\right)w1 + \left(\sum_{j=1}^{m} xjnxj2\right)w2 + \ldots + \left(\sum_{j=1}^{m} xjnxjn\right)wn = \left(\sum_{j=1}^{m} xjnyi\right) \end{cases} \qquad (10)$$

Since the normal equation of Expression (10) is simultaneous equations in which the number of unknowns is n pieces, most probable value of each wi can be found by this Expression. Actually, simultaneous equations are solved by employing general matrix solution such as sweep out method (Gauss-Jordan' method of elimination) or the like.

The normal equation adding sections 66 and 67 respectively perform the addition of the normal equation using class information supplied from the class categorization sections 63 and 64, a prediction tap of two pairs supplied from the prediction tap region slicing section 65 and a HD signal to be prepared.

After data input of the number of frames sufficient for learning is terminated, the normal equation adding sections 66 and 67 output the normal equation data to the prediction coefficient determination section 68.

In the prediction coefficient determination section 68, the operated prediction coefficient is written in the prediction coefficient memories 15 and 25 as well as the above-described simultaneous equations is solved to obtain most probable value of each wi which is a prediction coefficient.

Figure 6:
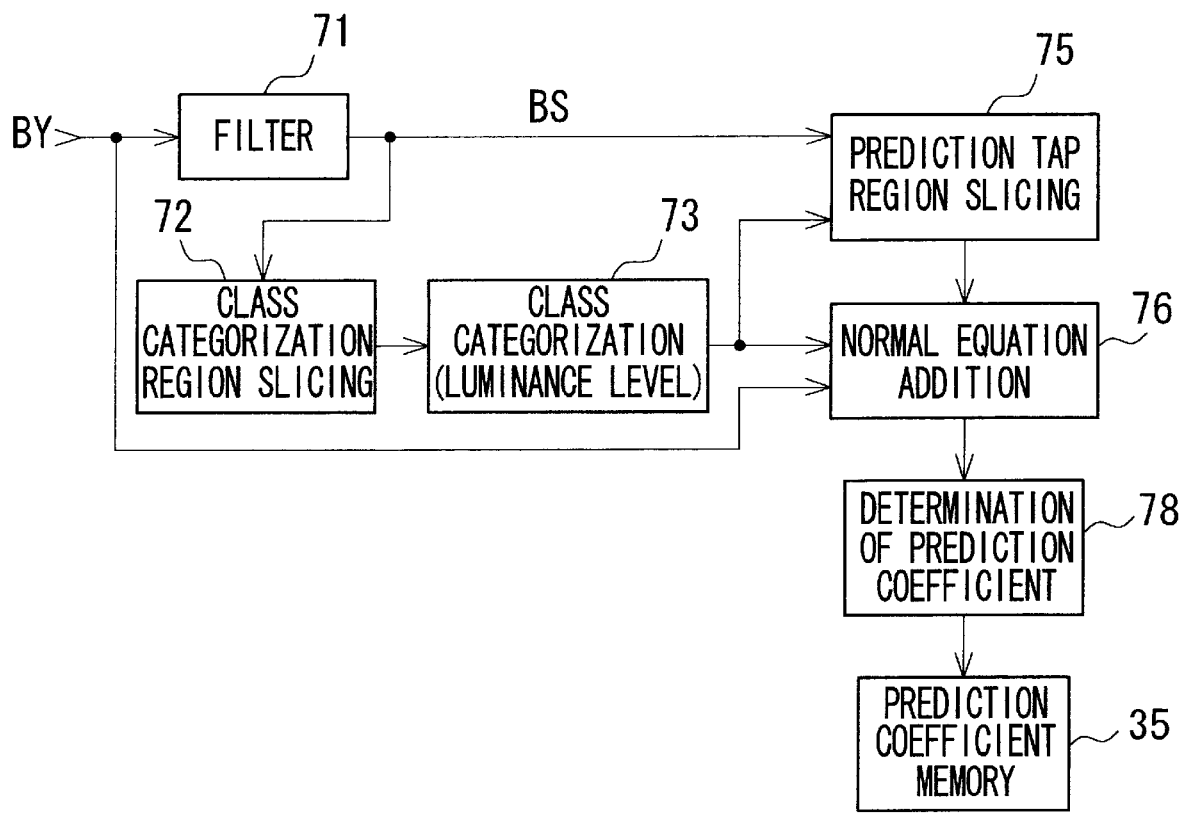
FIG. 6 is a block diagram showing a constitution of a prediction coefficient learning block (tone conversion)

Next, FIG. 6 shows a constitution of a prediction coefficient learning block for preparing a prediction coefficient necessary to perform tone conversion. In the filter 71, a student signal BS is formed by performing conversion of a signal level from teacher signal BY of correct luminance level of tone, and supplied to the class categorization region slicing section 72 and the prediction tap region slicing section 73. The teacher signal BY input into this filter 71 and the student signal BS output from the filter 71 are made as a pair for learning, the preparation of the prediction coefficient is performed.

Figure 1:
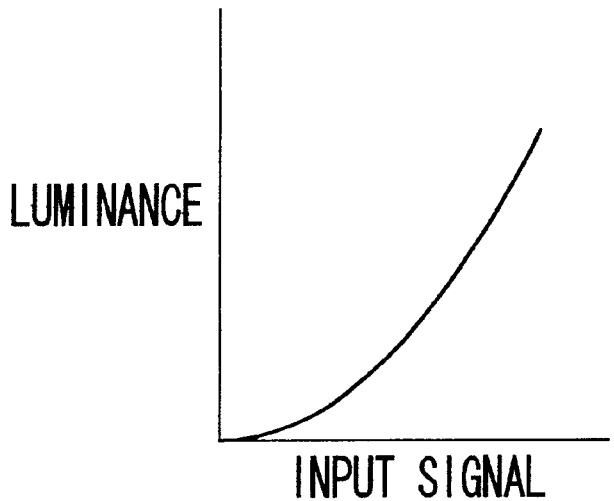
FIG. 1 is a graphical representation showing characteristics of display device using a cathode-ray tube.
Figure 2:
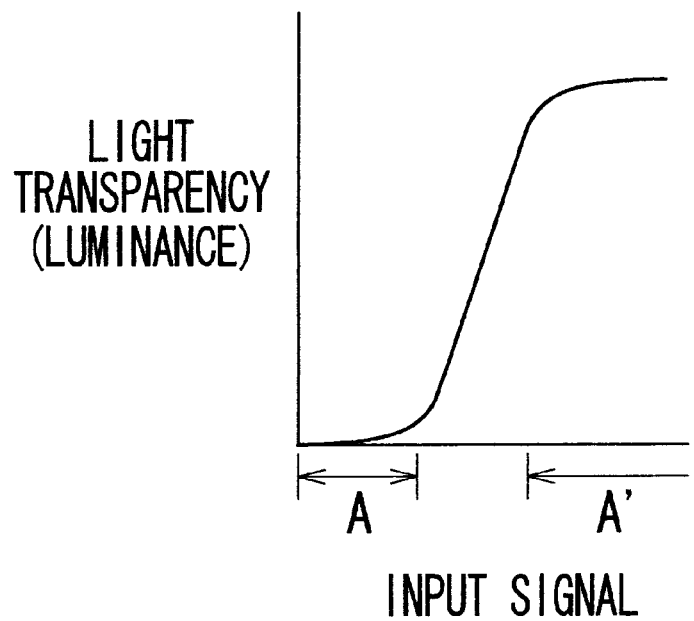
FIG. 2 is a graphical representation showing characteristics of display device using a liquid crystal display element.
Figure 7:
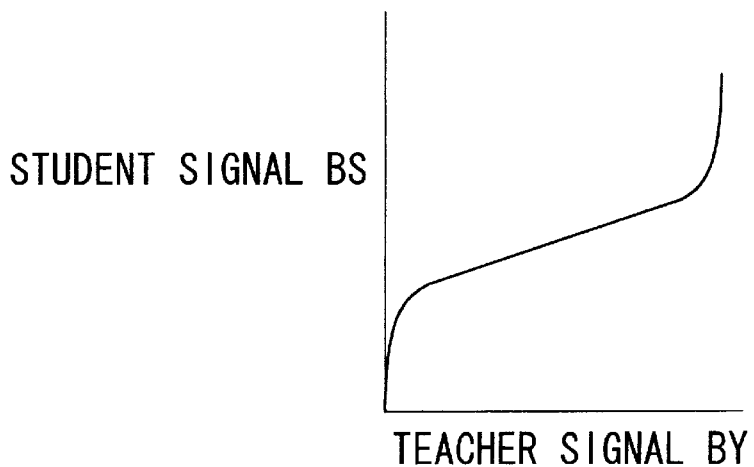
FIG. 7 is a graphical representation showing a characteristic of the filter 71.

The filter 71 is a filter for converting a signal level of the teacher signal BY so that the overall characteristics of the student signal BS and a display device are in a linear shape, for example, when the characteristic of the display device is a characteristic as shown in FIG. 2, the student signal DS is generated by correcting the teacher signal BY as shown in FIG. 7 so that the tone level of image can be correctly reproduced on the screen of the display device making the overall characteristics as in a linear shape.

A tone level corrected SD signal from this filter 71 is supplied to the class categorization region slicing section 72 and the prediction tap region slicing section 75. In the class categorization region slicing section 72, the region slicing is carried out from the tone level corrected SD signal is performed and pixel data within the region is supplied to the class categorization section 73.

The class categorization section 73 generates a class categorization code using ADRC, similar to the class categorization section 63 and the like and supplies it to the prediction tap region slicing section 75 and the normal equation adding section 76. In the prediction tap region slicing section 75, for example, a plurality of peripheral pixels as a center of the pixel of interest are set on the basis of a class categorization code as a prediction tap, and supplied to the normal equation adding section 76.

In the normal equation adding section 76, normal equation data is generated and supplied to the prediction coefficient determination section 78, in the prediction coefficient determination section 78, a prediction coefficient is operated by performing operation processing using the normal equation data. In the normal equation adding section 76 and the prediction coefficient determination section 78, the processes similar to the above-described normal equation adding section 66 and the prediction coefficient determination section 68 are performed, and the prediction coefficient operated in the prediction coefficient determination section 68 is written in the prediction coefficient memory 35.

As a result of performing learning described above, in the prediction coefficient memories 15 and 25, the prediction coefficient which is used for estimating the data of the pixel prepared capable of estimating it to reach a value statistically closest to the true value is to be stored. Moreover, in the prediction coefficient memory 35, the prediction coefficient which is used for estimating the luminance level of the pixel of interest per each class and capable of estimating it to reach a value statistically closest to the true value is to be stored.

Moreover, the number of pieces of prediction taps output by the prediction tap region slicing sections 65 and 75 is made larger than the number of pieces of prediction taps used in an image signal processing device, in the prediction coefficient determination sections 68 and 78, a large number of prediction coefficients are found per each class, the prediction coefficient whose absolute value is larger is in turn selected among these prediction coefficients for use, and each of the selected prediction coefficient is stored in an address position corresponding to the prediction coefficient memories 15, 25 and 35, respectively as well.

Next, operations will be described below. First, when it is distinguished that not only an image based on a SD signal, but also an image based on a HD signal having a higher resolution than that of a SD signal is also capable of being displayed, the movable terminal c of the signal switching section 42 is set on the side of the terminal (a) by corresponding to a switching control signal CSB as well as a cathode-ray tube is used as a display device by the means of the communication between the control section 50 and the image display device. Moreover, the movable terminal (c) of the signal switching section 41 is alternatively switched on the side of the terminal (a) or on the side of the terminal (b) in a cycle of a HD signal.

Figure 8A:
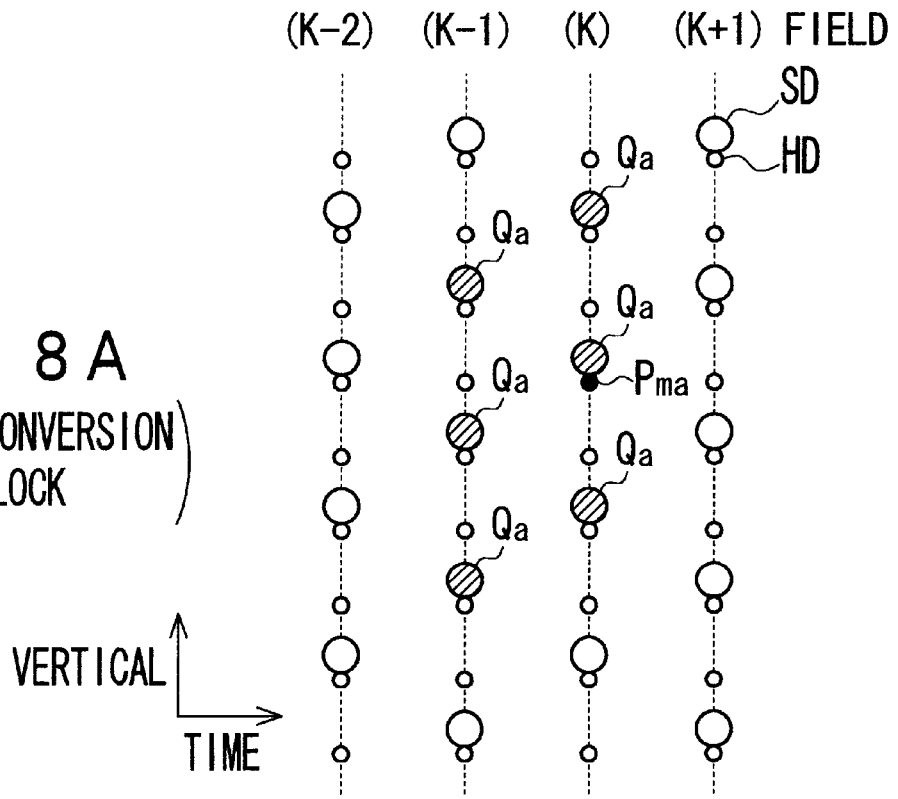
FIGS. 8A and 8B are drawings illustrating a pixel slicing of the resolution conversion block.

Now, in the class tap construction section 11 and the prediction tap construction section 13 of the resolution conversion main block 10, a SD signal is sliced to the prepared pixel located nearby the line of the SD signal, for example, as shown in FIG. 8A, a pixel located in upward, downward, left and right directions is sliced to the prepared pixel Pma as a peripheral pixel Qa for resolution conversion including a time base direction. It should be noted that the number of sliced pixels in the class tap construction section 11 and the prediction tap construction section 13 may be equal or different.

In the class tap construction section 11, the data of peripheral pixels for resolution conversion is class-classified as a space class tap, the obtained space class categorization code is supplied to the prediction tap selection section 14 and the prediction coefficient memory 15.

In the prediction tap selection section 14, the selection of the prediction taps is carried out based on the space class categorization code. For example, when it is indicated by the space class categorization code that a variation of pixel data level is slight, if the region to be selected as a prediction tap is narrow, the difference between pixel data operated by the sum of products operation section 16 does not appear. Therefore, the prediction tap is selected so that the region to be selected as a prediction tap is widened, and the difference between pixel data is generated.

In this way, two-fold pixel data nearby the line of a SD signal can be generated by performing the sum of products operation shown in Expression (1) using a prediction coefficient read from the prediction tap selected in the prediction tap selection section 14 and the prediction coefficient memory 15 based on the space class categorization code.

Figure 8B:
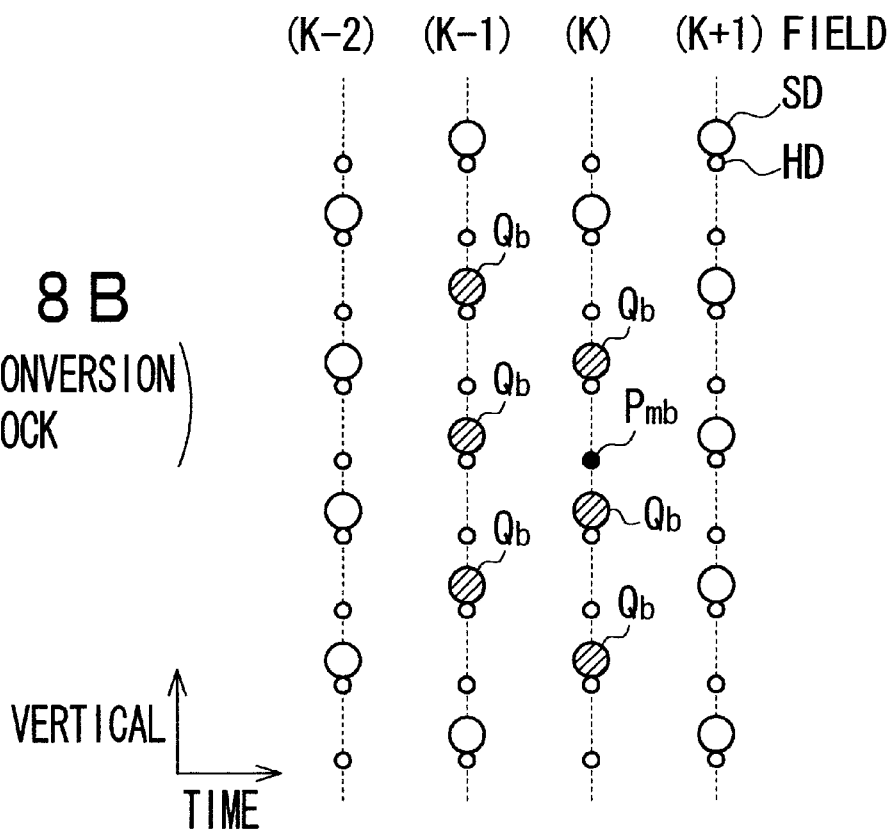

Similarly, in the class tap construction section 21 and the prediction tap construction section 23 of the resolution conversion sub-block 20, a SD signal is sliced to the prepared pixel Pmb located away from the line of a SD signal. For example, as shown in FIG. 8B, pixels located in the upward, downward, left and right directions with respect to the prepared pixel are sliced as a peripheral pixel QB for resolution conversion including time base direction, and pixel data of two-fold can be generated at the position away from the line of a SD signal by performing the sum of products operation using a prediction tap and a prediction coefficient selected based on the space class categorization code obtained by the class categorization Now, pixel data generated in the resolution conversion main block 10 is supplied to the line doubler 17 and the pixel data is read at the two-fold frequency of the SD signal and pixel data generated in the resolution conversion sub-block 20 is supplied to the line doubler 27, the pixel data is read at the two-fold frequency of the SD signal as well, and further, a HD signal whose resolution conversion from the movable terminal (c) of the signal switching section 41 can be obtained by alternatively selecting the data read from the line doublers 17 and 27 at the horizontal frequency of a HD signal.

Figure 9:
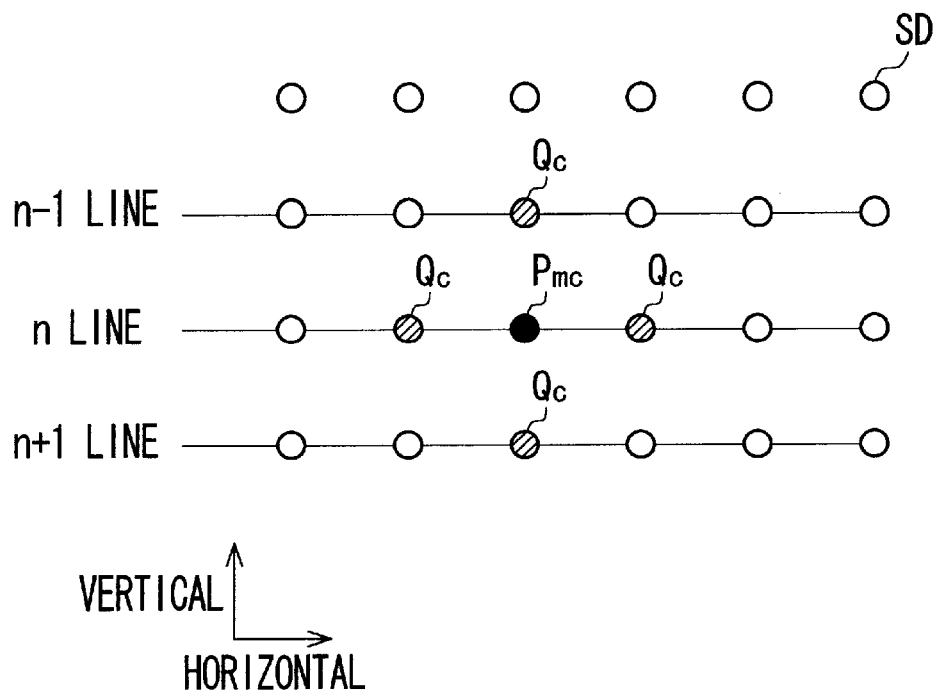
FIG. 9 is a drawing illustrating a pixel slicing of the resolution conversion block.

Moreover, similarly also in the class tap construction section 31 and the prediction tap construction section 33 of the tone level conversion block 30, a SD signal is sliced with respect to the pixel of interest performing a tone level conversion. For example, as shown in FIG. 9, the pixel located in the upward, downward, left and right directions with respect to the pixel of interest Pmc is sliced as a peripheral pixel Qc for tone level conversion, in the class categorization section 32, the luminance class categorization code is generated, in the prediction tap selection section 34, the selection of the prediction tap is performed on the basis of the luminance class categorization code. For example, when it is indicated that the luminance gradient of an image is mild and a variation of levels is slight by the luminance class categorization code, if the region selected as a prediction tap is narrow, the difference of the luminance data operated by the sum of products operation section 36 does not appear. Therefore, the prediction tap is selected so that the region to be selected as a prediction tap is widened, and specifically, the difference between pixel data is generated.

In this way, the luminance data is operated and the luminance data of the pixel of interest can be corrected by performing the sum of products operation indicated in Expression (2) using a prediction tap selected in the prediction tap selection section 34 and a prediction coefficient read from the prediction coefficient on the luminance class categorization code.

Figure 10:
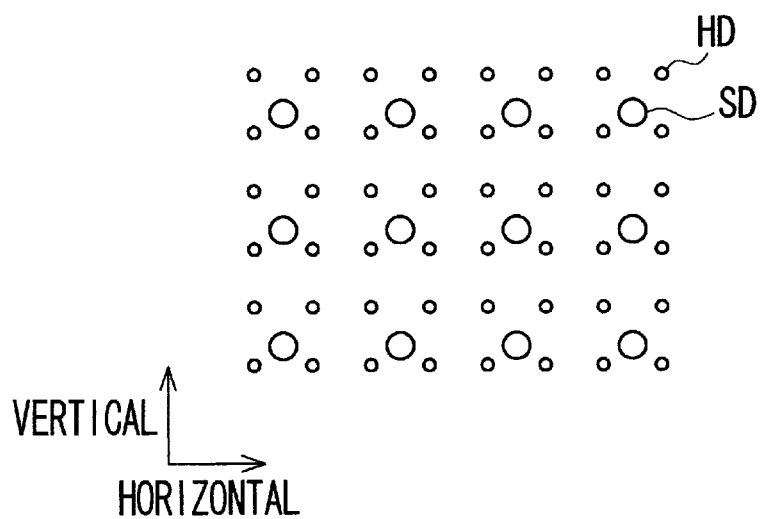
FIG. 10 is a drawing showing the result of a resolution conversion.

Now, a cathode-ray tube is used as a display device by the setting condition of the processing mode setting switch 51 or the communication between the control section 50 and the image display device, and when it is distinguished that not only an image based on a SD signal but also an image based on a HD signal can be displayed, the movable terminal of the signal switching section 42 is set on the side of the terminal (a). In this case, as shown in FIG. 10, since a new pixel is generated between the pixels on the basis of SD signal and a HD signal is output, an image of high resolution can be displayed.

Figure 11:
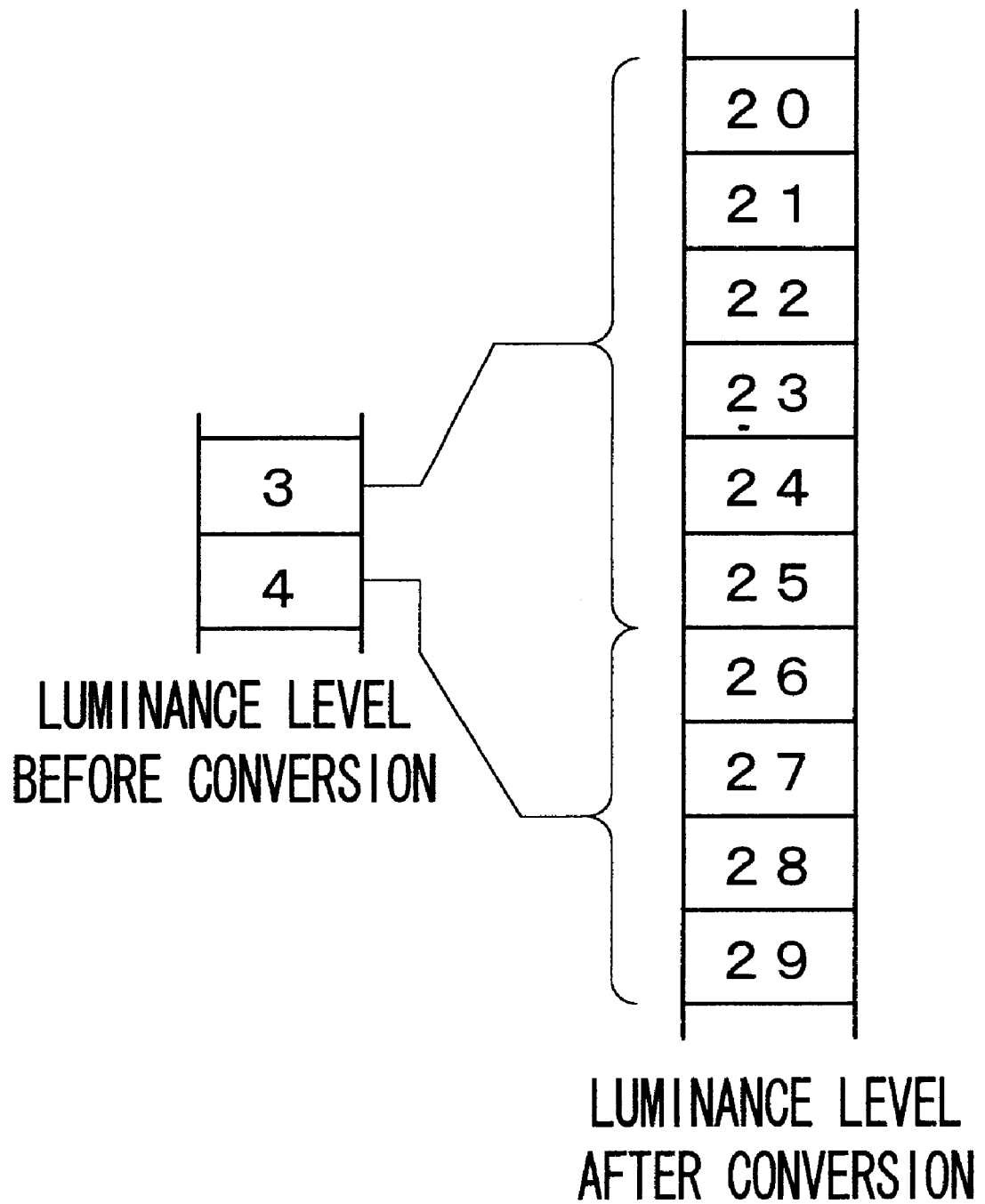
FIG. 11 is a diagram illustrating a tone conversion operation.
Figure 12A:
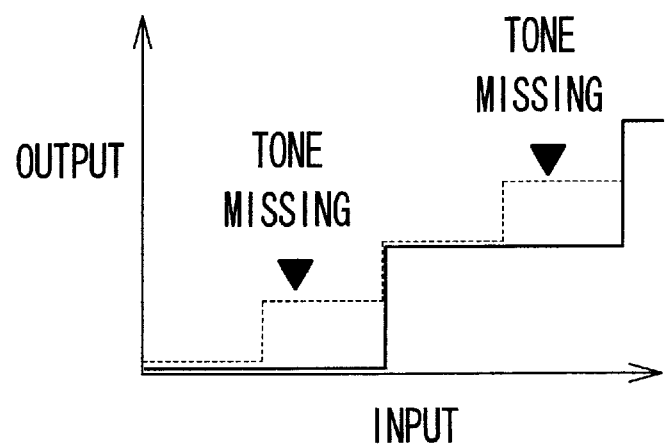
FIGS. 12A and 12B are graphical representations showing tone levels of before and after the tone conversion.
Figure 12B:
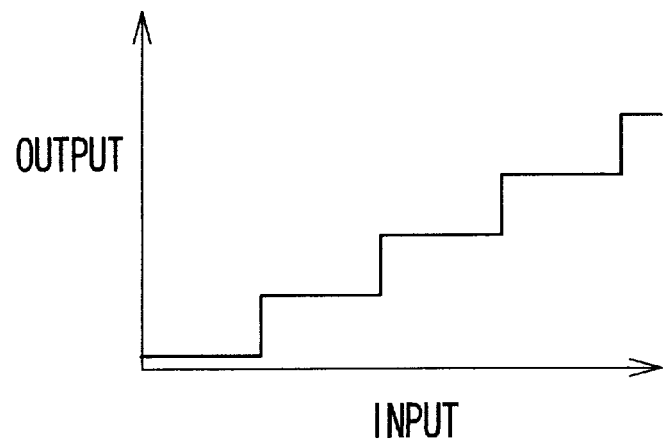
Figure 13A:
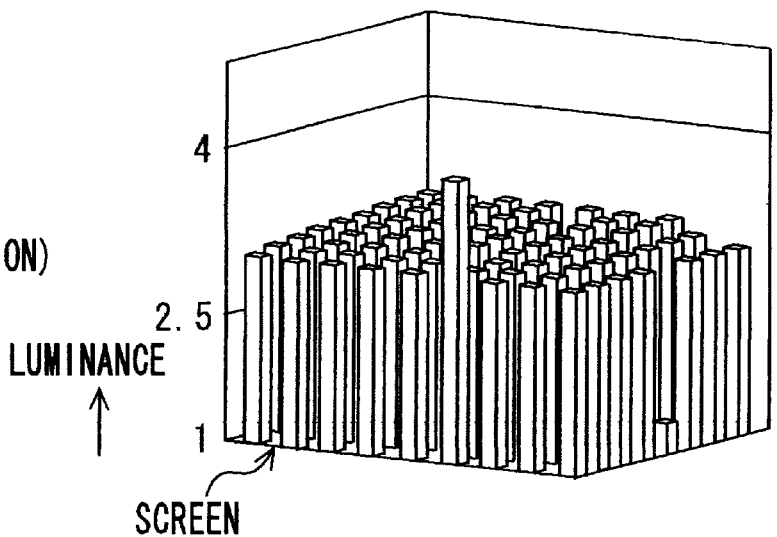
FIGS. 13A through 13C are graphical representations showing a luminance distribution on the screen before and after the tone conversion.
Figure 13B:
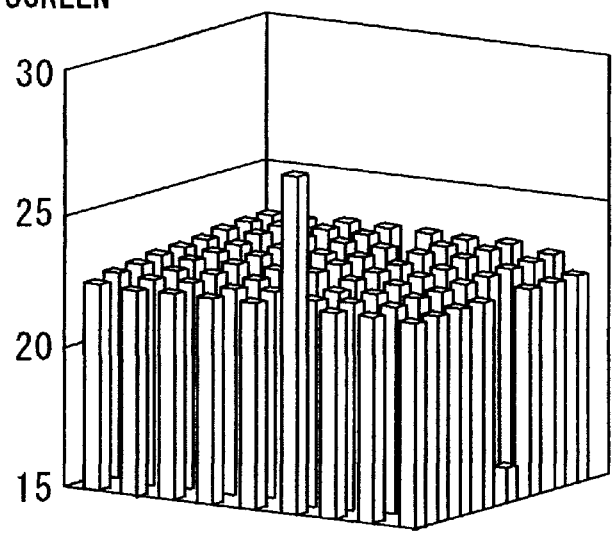
Figure 13C:
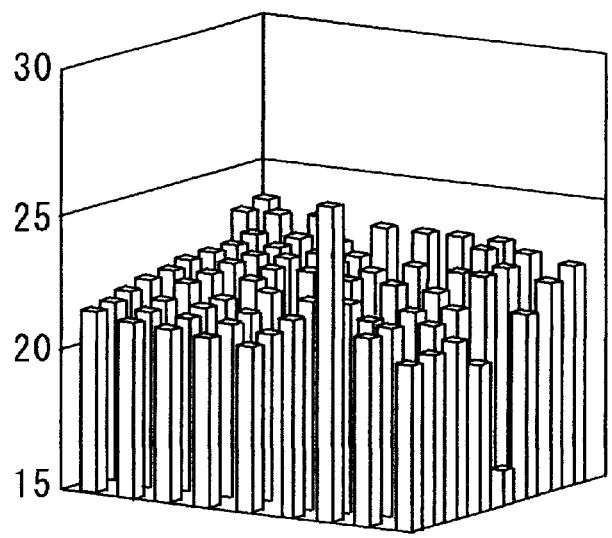

Moreover, when it is distinguished that a liquid crystal display element is used as a display device, the movable terminal (c) of the signal switching section 42 is set on the side of the terminal (b) by the switching control signal CSB. In this case, since the luminance level of the pixel of interest is adjusted corresponding to the luminance level distribution pattern including the luminance level of the pixel of interest and peripheral pixels, for example, as shown in FIG. 11, when the signal level of an input image signal is "3", the signal level is converted into any of "20"-"25" corresponding to the pattern of the luminance level distribution including peripheral pixels, when the signal level is "4", the signal level is converted into any of "26"-"29" corresponding to the pattern. Specifically, in the case where input and out put characteristics are linear shape and the tone level display is carried out as shown in a dotted line of FIG. 12A, since input and output characteristics of the display device is non-linear shape, even if the tone level is missed as shown in a full line, the tone level creation is carried out by the tone conversion processing, as shown in FIG. 12B, the tone level similar to that of the case where the input and output characteristics is in a linear shape can be made being held. Therefore, as shown in FIG. 13A, even in the case where an image is blacked and collapsed because the luminance level on the screen is small and the image can be displayed in a sufficient tone level, conversion of the luminance level is carried out so as to be capable of obtaining a sufficient tone level, the tone level creation is performed by the luminance level of peripheral pixels, and the luminance level is heightened as in the case of table conversion shown in FIG. 13B, however, the luminance level is heightened as shown in FIG. 13C without being a flat image whose contrast is slight because of the difference of the luminance level is slight, the tone creation is also carried out and the image can be displayed in a high quality image.

By the way, in the above-described embodiment, the resolution conversion main block 10 for performing the resolution conversion and the resolution conversion sub-block 20 and the tone conversion block 30 have been separately provided, however, the resolution conversion main block 10 and the resolution conversion sub-block 20 and the tone conversion block 30 are made approximately in the same constitutions. Therefore, one block can be also shared between the resolution conversion and the tone conversion by memorizing prediction coefficient memorized in the prediction coefficient memory of the tone conversion block 30 in the prediction coefficient memory of any one of the resolution conversion main block 10 and the resolution conversion sub-block 20.

Figure 14:
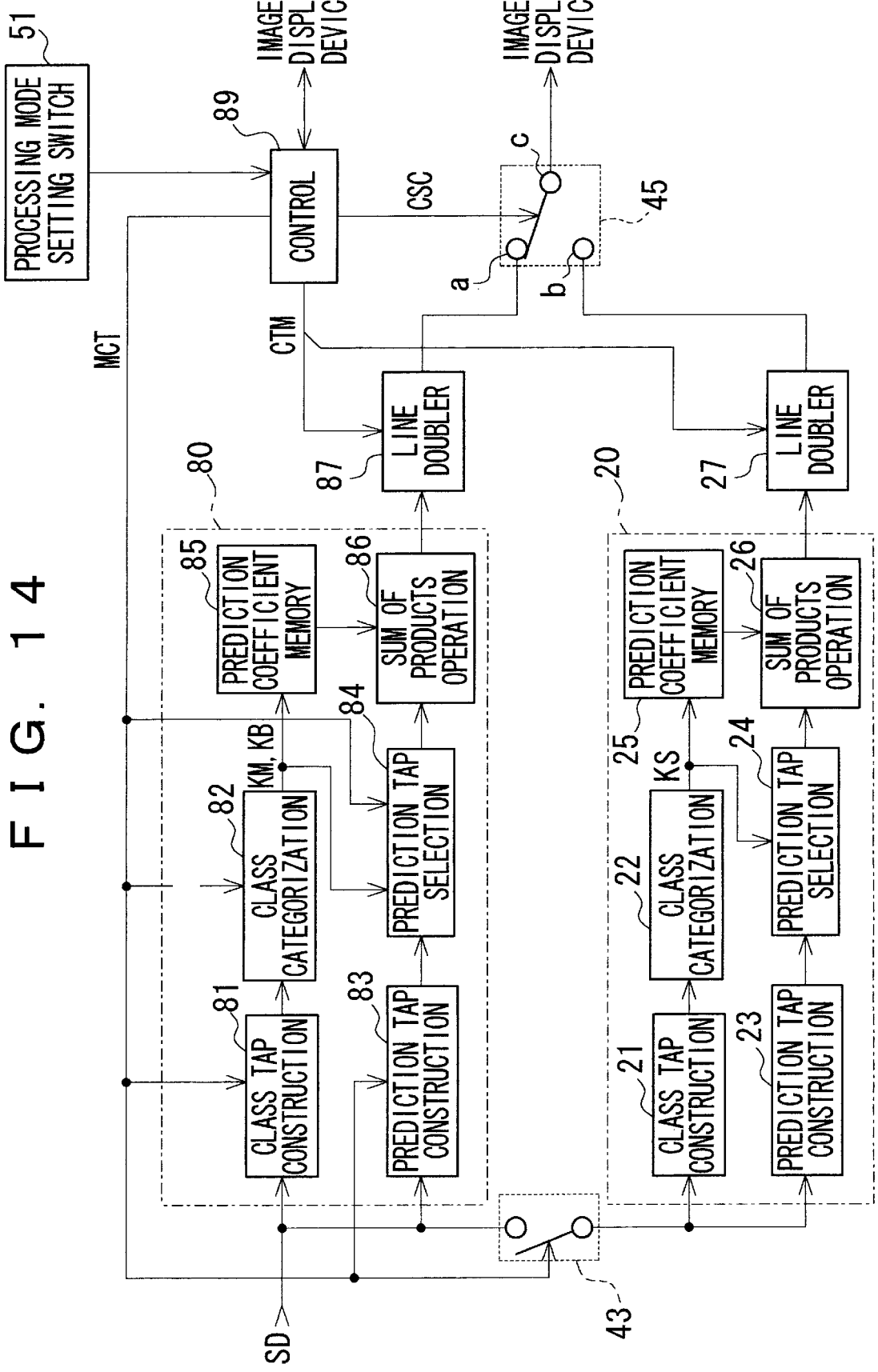
FIG. 14 is a block diagram showing another embodiment of a constitution of a digital signal processing apparatus of the present invention.

FIG. 14 shows a constitution of an image signal processing device constituted so that operations of the tone conversion block 30 and, for example, the resolution conversion main block 10 are performed in one complex conversion block 80.

The luminance data of SD signal is supplied to the class tap construction section 81 of the complex conversion block 80 and the prediction tap construction section 83. Moreover, the SD signal is also supplied to the class tap construction section 21 of the resolution conversion sub-block 20 and the prediction tap construction section 23 via the switch 43. It should be noted that the resolution conversion sub-block 20 is identical with the above-described embodiment and the description is omitted.

In the class tap construction section 81, the region of a plurality of pixels on the periphery is sliced to the prepared pixel on the basis of the conversion mode setting signal MCT from the control section 89 described later, or the region of the pixel of interest and peripheral pixels for tone conversion on the periphery of it correcting the luminance level, and the data of the pixels within the region is supplied to the class categorization section 82.

In the class categorization section 82, the level distribution pattern of the pixel of the sliced region is distinguished and class categorization is carried out. In this class categorization, class categorization processing is carried out on the basis of the conversion mode setting signal MCT supplied from the control section 89, the class categorization code is generated and supplied to the prediction tap selection section 84 and the prediction coefficient memory 85.

In the prediction tap construction section 83, the prediction tap is sliced from the region which has been set and supplied to the prediction tap selection section 84 as well as the setting of the region including the prediction tap from SD signal which is necessary to the prediction operation on the basis of the conversion mode setting signal MCT supplied from the control section 89 is performed, the prediction tap is sliced from the region which has been set and supplied to the prediction tap selection section 84.

In the prediction tap selection section 84, the selection of the prediction tap supplied from the prediction tap construction section 83 is performed and the selected prediction tap is supplied to the sum of products operation section 86.

In the prediction coefficient memory 85, a prediction coefficient for the resolution conversion acquired by learning the relationship between a SD signal and a HD signal and a prediction coefficient for tone conversion acquired by learning the relationship between a SD signal of correct tone before the correction and a luminance of an image displayed by a display device are memorized per each class. These prediction coefficients are information for converting a SD signal into a HD signal by a linear estimation equation and carrying out a tone creation of a SD signal. Now, when the class categorization code is supplied to the prediction coefficient memory 85, any of a prediction coefficient for resolution conversion or a prediction coefficient for tone conversion on the basis of the conversion mode setting signal MCT supplied from the control section 89, a prediction coefficient corresponding to the class categorization code from the selected prediction coefficients is read and supplied to the sum of products operation section 86.

In the sum of products operation section 86, data of the prepared pixel is operated or data that tone creation of the pixel of interest is carried out is operated by performing operation with linear combination equation using a prediction tap from the prediction tap selection section 84, a prediction coefficient read from the prediction coefficient memory 85.

Now, the sum of products operation section 86 outputs the pixel data of the number of two-fold in the horizontal direction as well as data on the existing line of a SD signal in the case where the data of the prepared pixel is operated.

The pixel data generated in the sum of products section 86 is supplied to the line doubler 87. In the line doubler 87, the write and read control signal CTM is supplied from the control section 89, data supplied from the sum of products operation section 86 is read at the horizontal frequency or for example, at the two fold frequency of a SD signal by this write and read control signal CTM, supplied on the side of the terminal (a) of the signal switching section 45. Moreover, on the side of the terminal (b) of the signal switching section 45, a signal output from the line doubler 27 is supplied. In this signal switching section 45, the switching control signal CSC is supplied from the control section 89, the movable terminal (c) is switched on the side of the terminal (a) or on the side of the terminal (b) by this switching control signal CSC.

In the switch 43, the conversion mode setting signal MCT is supplied from the control section 89, the switching operation is controlled on the basis of the conversion mode setting signal MCT.

In the control section 89, display device information is obtained by communication with an image display device, the display device used in the image display device is distinguished. Now, in the control section 89, if the display device is of a cathode-ray tube, of a liquid crystal display element or the like, and to what degree the resolution is are distinguished on the basis of the obtained display device information, the conversion mode setting signal MCT, the write and read control signal CTM and the switching control signal CTC are generated, supplied to the complex conversion block 80, the switch 43, the line doublers 27 and 87 and the signal switching section 45 on the basis of the determination results, and the resolution conversion or the tone conversion is carried out corresponding to the display device.

Now, in the control section 89, when it has been distinguished that a display device is, for example, of a cathode-ray tube, and of an image display based on a HD signal, the switch 43 is in an on-state by the conversion mode setting signal. Moreover, in the class tap construction section 81, the region of the peripheral pixels for resolution conversion is sliced similarly to the class tap construction section 11, in the class categorization section 82, similarly to the class categorization section 12, the level distribution pattern of the pixel of the sliced region is distinguished and class categorization is carried out as well.

In the prediction tap construction section 83, similarly to the prediction tap construction section 13, the setting of the region including the prediction tap from a SD signal necessary to the prediction operation, a prediction tap selection section 84 is sliced from the region which has been set, the prediction tap is sliced from the region which has been set and supplied to the prediction tap selected. Furthermore, in the prediction tap selection section 84, the selection of the prediction tap supplied from the prediction tap construction section 83 on the basis of the class categorization code similarly to the prediction tap selection section 14, and the selected prediction tap is supplied to the sum of products operation section 86.

Moreover, in the prediction coefficient memory 85, a prediction coefficient corresponding to the class categorization code is read from the prediction coefficient for resolution conversion.

In the sum of products operation section 86, similarly to the sum of products operation section 16, the operation is performed by linear combination equation using the prediction tap from the prediction tap selection section 84 and the prediction coefficient read from the prediction coefficient memory 85, thereby calculating data of pixel newly generated and supplying it to the line doubler 87.

Now, for example, the sum of products operation section 86 outputs the data on the existing line of a SD signal, the sum of products operation section 26 outputs the data on the prepared line located between the existing lines as well. Furthermore, the sum of products operation sections 26 and 86 output the pixel data of the number of two-fold in the horizontal direction.

In the line doublers 27 and 87, the line double speed processing is performed on the basis of the write and read control signal CTM, the line double speed processing is performed and the data output from the line doubler 87 is supplied to the terminal (a) of the signal switching section 45 as well as the data output from the line doubler 27 is supplied to the terminal (b) of the signal switching section 45.

In the signal switching section 45, the movable terminal (c) is alternatively switched to the terminal (a) and the terminal (b) in the horizontal cycle of a HD signal by a switching control signal CSC, and HD signal having a highly enhanced resolution of a SD signal can be made output from the movable terminal (c) of the signal switching section 45.

Moreover, in the control section 89, when it is distinguished that a display device is, for example, of a liquid crystal display element by the communication with an image display device, the switch 43 is in an off-state by a conversion mode setting signal. Moreover, in the class tap construction section 81, similarly to the class tap constructions section 31, the region of peripheral pixel for tone conversion is sliced, in the class categorization section 82, similarly to the class categorization section 32, the level distribution pattern of the pixel of the sliced region is distinguished and class categorization is carried out as well.

In the prediction tap construction section 83, similarly to the prediction tap construction section 33, the region including the prediction tap necessary to the prediction operation from the SD signal is set, the prediction tap is sliced from the region which has been set, and supplied to the prediction tap selection section 84. Furthermore, in the prediction tap selection section 84, similarly to the prediction tap selection section 34, based on the class categorization code, the selection of the prediction tap supplied from the prediction tap construction section 83 is performed, and the selected prediction tap is supplied to the sum of products operation section 86.

Moreover, in the prediction coefficient memory 85, the prediction coefficient corresponding to the class categorization code is read from the prediction coefficients for the tone conversion, supplied to the sum of products operation section 86.

In the sum of products operation section 86, similarly to the sum of products operation section 36, the operation by linear combination equation using the prediction tap from the prediction tap selection section 84 and the prediction coefficient read from the prediction coefficient memory 85, thereby generating a new data of the pixel of interest and the supplying to the line doubler 87.

In the line doubler 87, the data is supplied to the terminal (b) of the signal switching section 45 as data of a SD signal without performing line double processing of the supplied data on the basis of the write and read control signal CTM. Moreover, in the signal switching section 45, it is held in a state that the movable terminal (c) is switched on the side of the terminal (a) on the basis of the switching signal CSC. Therefore, the tone creation is performed, and from the movable terminal (c) of the signal switching section 45, a SD signal which is enhanced in tone can be made output.

In this way, since one conversion block can be shared between the resolution conversion and the tone conversion, the constitution can be simplified.

Moreover, in the above-described embodiment, when the resolution conversion and the tone conversion are performed, operation amount is class-classified, the class categorization code is generated using this categorization results, and the selection of the prediction tap and read of the prediction coefficient may be performed in consideration of the operation amount of an image as proposed in the specification and the drawings of Japanese Unexamined Patent Publication No. Hei 9-74543 gazette applied by the present applicant.

Figure 15:
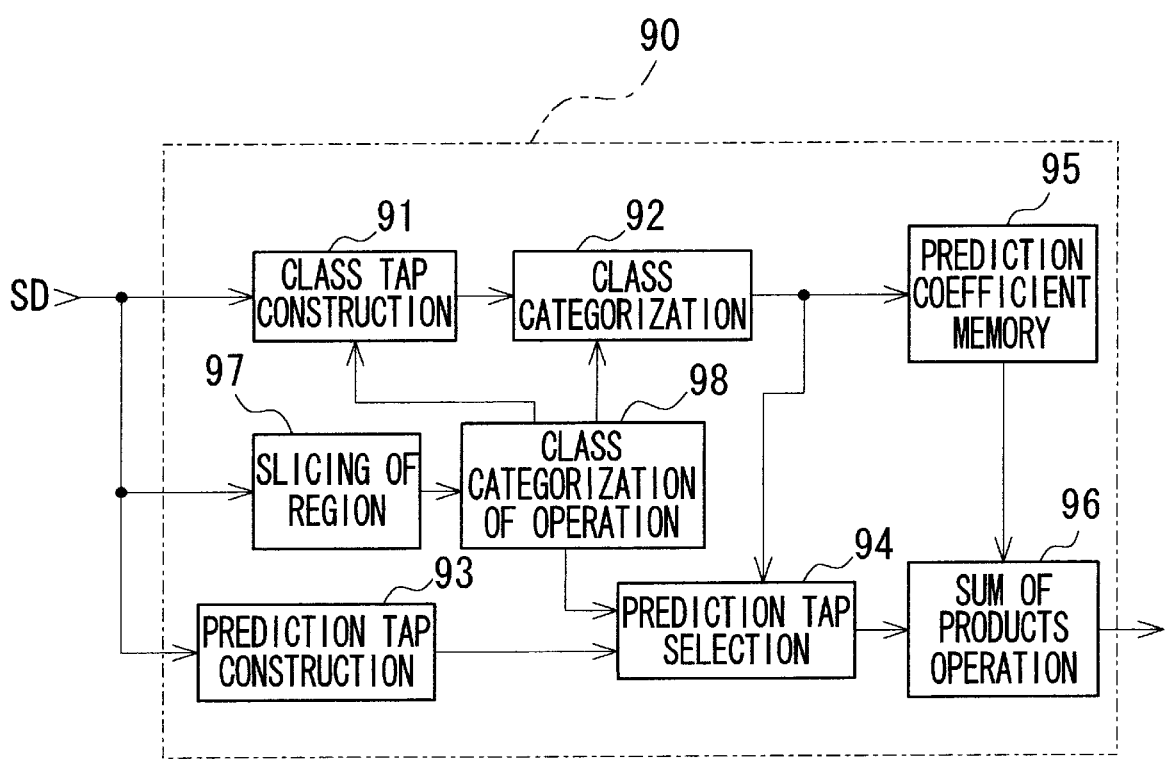
FIG. 15 is a block diagram showing a constitution of conversion block 90.

FIG. 15 shows a constitution of a conversion block still further in consideration of an operation amount of an image. In the class tap construction section 91 of the conversion block 90, the region of peripheral pixels for the resolution conversion or peripheral pixels for tone conversion is sliced, and the data of pixel within the region is supplied to the class categorization section 92.

In the class categorization section 92, the pattern of the level distribution is distinguished and class categorization is performed. In this class categorization section 32, as described above, for example, using ADRC, the class categorization code is generated and supplied to the prediction tap selection section 94 and the prediction coefficient memory 95.

In the prediction tap construction section 93, the prediction tap is sliced from SD signal and supplied to the prediction tap selection section 94. Moreover, in the prediction tap selection section 94, the selection of the pixels supplied from the prediction tap construction section 93 is carried out on the basis of the class categorization code from the class categorization section 92, and the data of the selected pixels is supplied to the sum of products operation section 96.

In the prediction coefficient memory 95, the prediction coefficient acquired by previously learning is memorized per each class, the prediction coefficient is read corresponding to the class categorization code and supplied to the sum of products operation section 96.

In the sum of products operation section 96, the sum of products operation between the prediction tap from the prediction tap selection section 94 and the prediction coefficient read from the prediction coefficient memory 95 is performed, and a new data is operated.

Now, in the region slicing section 97, in order to classify an amount of operation in a degree into classes, the slicing of a signal is performed from a SD signal making the prepared pixel and the pixel of interest as a reference. Here, the data of sliced pixels is supplied to an operation class categorization section 98. In the operation class categorization section 98, for example, interframe differential is operated using the pixel data of the sliced region, and an operation class code is generated by comparing the average value of its absolute values with threshold. This operation class code is supplied to the class tap construction section 91, and the class tap is sliced corresponding to the operation class code. Alternatively, the operation class code is supplied to the class categorization section 92, the final class code is generated from the class code on the basis of the operation class code and the class tap, and supplied to the prediction tap selection section 94 and the prediction coefficient memory 95. Further alternatively, the operation class code is supplied to the prediction tap selection section 94, and the selection of the prediction tap may be performed still further in consideration of the operation class code.

Figure 16A:
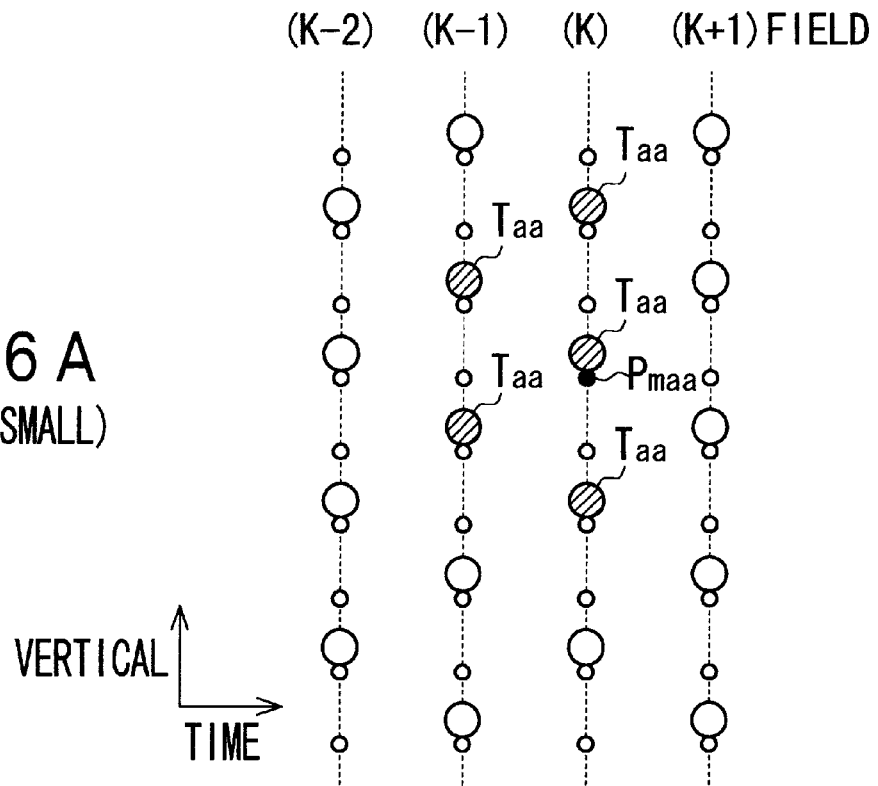
FIGS. 16A and 16B are drawings illustrating the selecting operation of a prediction tap when operation is detected.
Figure 16B:
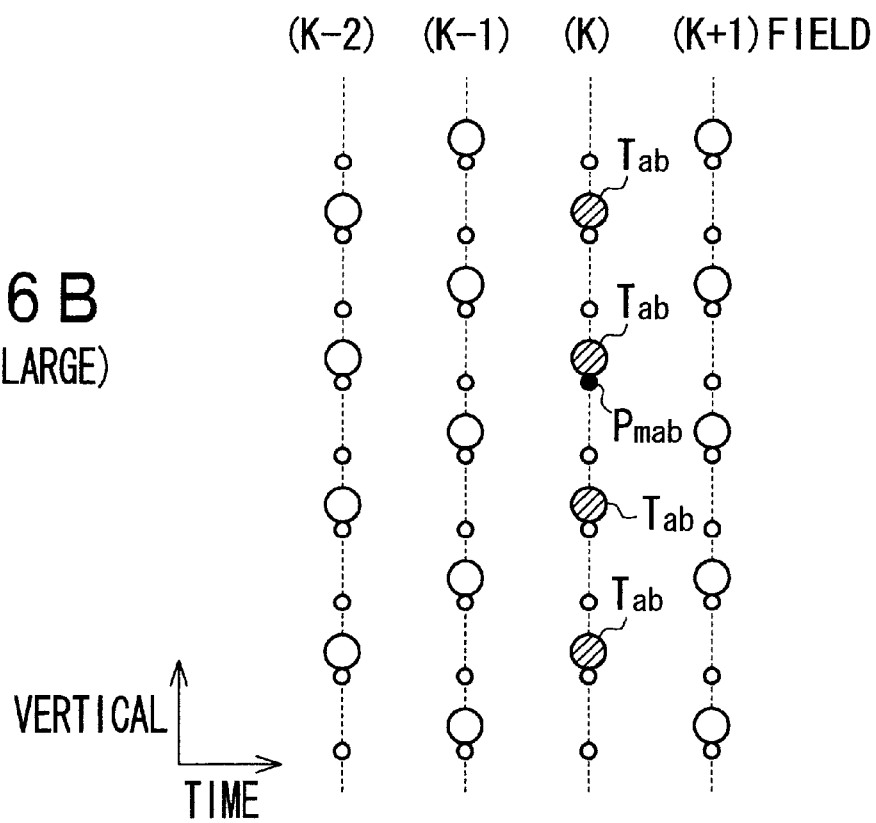

For example, when it is distinguished that the size of the operation is small by the operation class code, it is effective to use the pixels in the number of two fields portion or more than that. Therefore, as shown in FIG. 16A, the prediction tap Taa is selected with respect to the prepared pixel Pma. Moreover, when it is distinguished that the size of the operation is large by the operation class code, it is effective to use the pixels within one field. Therefore, as shown in FIG. 16B, the prediction tap Tab is selected with respect to the prepared pixel Pmab.

The sum of products operation is performed using the prediction tap thus selected and the prediction coefficient, thereby being capable of performing the resolution conversion processing corresponding to the operation of an image. Moreover, also in the tone conversion processing, the tone creation can be also carried out using the operation class code of an image.

Moreover, in the case of the above-described, the prediction coefficient used for linear combination equation of Expression (1) is memorized as a prediction operation setting information, however, the most suitable estimation equation is memorized per each class and the resolution conversion and the tone conversion processes with more higher precision can be carried out by operating using the estimation equation of the determined class and the prediction coefficient.

Furthermore, the prediction operation setting information is made provided per each display device, the most suitable resolution conversion and tone conversion processes corresponding to a variety of display devices can be carried out in the case where not only the resolution conversion and the tone conversion processes are switched but also the prediction operation setting information corresponding to the display device is selectable on the basis of the determination results of the display device based on the switch setting corresponding to a display device or the communication with an image display device as described above.

It should be noted that concerning with color signal data, it may be processed similarly to the luminance data, and as proposed in the specification and the drawings of Japanese Unexamined Patent Publication No. Hei 10-229565 gazette applied by the present applicant, a simple interpolation processing different from the luminance data may be performed, for example, an interpolation processing may be performed by operation processing using the color signal data of the lines located upper and lower of the field identical with that of the color signal data on the lines of the pixel of interest.

According to the present invention, the pixels on the periphery of the pixel of interest are selected from the input image signals, the level distribution pattern detection of the selected pixel data is performed, and class is determined based on the detected pattern, the pixel data of the foregoing subject pixel is generated by performing the prediction operation using the prediction coefficient corresponding to the foregoing determined class and the pixel data of the selected pixel corresponding to the foregoing subject pixel from the foregoing input image signal, and the resolution conversion processing for setting the pixel of the foregoing input image signal and a newly prepared pixel as the foregoing subject pixel and generating an image signal having a higher resolution than that of input image signal and the tone level conversion processing for setting the pixel of the foregoing input image signal as the foregoing subject pixel and generating the image signal whose tone level of the input image signal is corrected are alternatively carried out. Therefore, the resolution conversion processing and the tone level conversion processing can be efficiently carried out by one image signal processing device.

Moreover, since the prediction coefficient output corresponding to the selection of the pixels, the class determination and class thereof can be switched in the resolution conversion processing and the tone level conversion processing, a high quality image can be displayed.

Furthermore, the determination of an image display device performing an image display is performed, on the basis of the determination results, the resolution conversion processing or the tone level conversion processing is performed. Therefore, an image can be displayed in a high quality image corresponding to an image display device.

It will also be appreciated that, although a limited number embodiments of the invention have been described in detail for purposes of illustration, various modifications may be made without departing from the spirit and scope of the invention. Accordingly, the invention should not be limited except as by the appended claims.

What is claimed is:

1. A digital signal processing apparatus for processing an input digital image signal and generating an output digital image signal, comprising:

generating means for generating the output digital image signal, said means being supplied with said input digital image signal and having
means for clustering a plurality of pixel data of said input digital image signal adjacent to a subject pixel data to produce a class,
a memory for storing predictive operation parameter data for respective classes at addresses corresponding to said respective classes determined by said clustering means, means for selecting a plurality of pixel data from said input digital image signal corresponding to a pixel data of said output digital image signal, and predictive operating means for operating said predictive operation parameter data from said memory and said plurality of pixel data from said selecting means; and control means for controlling said generating means such that said generating means selects one of a plurality of kinds of predictive operation and generates the output digital image signal corresponding to the selected kind of predictive operation.

2. The digital signal processing apparatus according to the claim 1, wherein said generating means includes first generating means corresponding to a first kind of predictive operation and second generating means corresponding to a second kind of predictive operation, and wherein said control means controls said first and second generating means so as to select their outputs.

3. The digital signal processing apparatus according to the claim 1, wherein said control means controls said clustering means and said selecting means so as to select one of the kinds of predictive operation.

4. The digital signal processing apparatus according to the claim 1, wherein said plurality of kinds of predictive operation include resolution conversions and tone conversion.

5. The digital signal processing apparatus according to the claim 1, wherein said control means controls the generating means based on a type of display device to be connected with said output digital image signal.

6. A digital signal processing method for processing an input digital image signal and generating an output digital image signal, comprising the steps of:

clustering a plurality of pixel data of said input digital image signal adjacent to a subject pixel data by clustering means to produce a class;

storing predictive operation parameter data for respective classes at addresses of memory corresponding to said respective classes determined by said clustering means;

selecting a plurality of pixel data from said input digital image signal corresponding to a pixel data of said output digital image signal by selecting means;

operating said predictive operation parameter data from said memory and said plurality of pixel data from said selecting means to produce a plurality of kinds of predictive operation of generating means; and selecting one of said kinds of predictive operation to generate the output digital image signal corresponding to the selected kind of predictive operation.

7. The digital signal processing method according to the claim 6, further comprising the step of controlling said clustering means and said selecting means so as to select one of the kinds of predictive operations.

8. The digital signal processing method according to the claim 6, wherein said plurality of kinds of operation includes resolution conversion and tone conversion.

9. The digital signal processing method according to the claim 6, further comprising the step of controlling said generating means based on a type of display device to be connected with said output digital image signal.

10. A digital signal processing method for processing an input digital image signal and generating an output digital image signal, comprising the steps of:

clustering a plurality of first pixel data of said input digital image signal adjacent to a subject pixel data by first clustering means to produce a first class;

storing first predictive operation parameter data for the first class at address of first memory corresponding to said first class determined by said first clustering means;

selecting a plurality of first pixel data from said input digital image signal corresponding to first pixel data of said output digital image signal by first selecting means;

operating said first predictive operation parameter data from said first memory and said plurality of first pixel data from said selecting means to produce a plurality of kinds of first predictive operation of first generating means;

clustering a plurality of second pixel data of said input digital image signal adjacent to said subject pixel data by second clustering means to produce a second class;

storing second predictive operation parameter data for the second class at address of second memory corresponding to said second class determined by said second clustering means;

selecting a plurality of second pixel data from said input digital image signal corresponding to second pixel data of said output digital image signal by second selecting means;

operating said second predictive operation parameter data from said second memory and said plurality of second pixel data from said second selecting means to produce a plurality of kinds of second predictive operation of second generating means; and controlling said first and second generating means so as to select one of the plurality of kinds of first and second predictive operation of first and second generating means as their outputs.

* * * * *